United States Patent [19]

Yaguchi et al.

[11] 4,269,806
[45] May 26, 1981

[54] SCRUBBER FOR REMOVAL OF SULFUR DIOXIDE FROM EXHAUST GAS

[75] Inventors: Kunihide Yaguchi; Masakazu Takaiwa; Minoru Aoki, all of Iwaki, Japan

[73] Assignee: Kureha Kagaku Kogyo Kabushiki Kaisha, Tokyo, Japan

[21] Appl. No.: 64,638

[22] Filed: Aug. 7, 1979

[51] Int. Cl.³ .................... B01D 47/12; B01J 10/02
[52] U.S. Cl. ........................ 422/171; 55/223; 110/215; 261/17; 261/112; 261/113; 261/DIG. 9
[58] Field of Search ............. 422/168, 169, 170, 171; 261/17, 111, 112, 113, DIG. 9; 55/223; 110/215; 423/166, 243

[56] References Cited
U.S. PATENT DOCUMENTS

| | | | |
|---|---|---|---|
| 2,234,385 | 3/1941 | Ryner | 261/113 |
| 3,227,429 | 1/1966 | Renzi | 261/112 |
| 3,969,447 | 7/1976 | Glitsch et al. | 261/112 X |
| 4,092,402 | 5/1978 | Kobayashi et al. | 423/243 |

Primary Examiner—Bradley Garris
Attorney, Agent, or Firm—Wegner & Bretschneider

[57] ABSTRACT

A method and apparatus for removing sulfur dioxide from an exhaust gas with use of an absorbent containing a salt of an organic acid within a scrubber provided with perforated plates, characterized in that the vapor of organic acid discharged from the top of the perforated plates is absorbed into the absorbent with a pH value of 6 to 8 within wetted walls provided on the upper side of the perforated plates.

1 Claim, 3 Drawing Figures

SCRUBBER FOR REMOVAL OF SULFUR DIOXIDE FROM EXHAUST GAS

The present invention relates to a method and an apparatus for removing sulfur dioxide from an exhaust gas containing sulfur dioxide within a scrubber provided with perforated plates using an aqueous solution containing a salt of an organic acid as an absorbent liquid, and especially relates to a method of substantially absorbing a vapor of organic acid let loose by the absorption of sulfur dioxide into the aqueous solution containing the above-mentioned salt without removing the organic acid out of the scrubber circulating loop.

Sulfur dioxide is a main component of many industrial effluents such as those from coal or oil-burning electric power plants, furnace exhausts, smelter gases and various other chemical-and petroleum operations. In view of the noxious effect of sulfur dioxide on the environment, many processes have been developed for removal of sulfur dioxide from the exhaust gases.

The most effective method of the above-mentioned many processes includes the process for scrubbing sulfur dioxide from an exhaust gas using an aqueous solution containing a salt of an organic acid as an absorbent. This method is recognized to be more excellent than the other method using an aqueous solution containing alkali sulfite or a slurry of calcium hydroxide as an absorbent for the reason that there are no troublesome disadvantages of generating scales and of stepwise reduction of absorbancy which are inherent in the latter methods.

The process with use of the absorbing liquid containing the salt of organic acid commonly includes, as disclosed in U.S. Pat. Nos. 3,928,537, 3,987,149 and 4,092,402, a scrubber circulating loop wherein the exhaust gas is brought into contact with the absorbent within a scrubber counter-currently to absorb sulfur dioxide into the liquid and to convert the absorbed sulfur dioxide into a sulfite and then directly or after blowing air into the effluent liquid from the scrubber to oxidize the sulfite into sulfate, calcium hydroxide or calcium carbonate is added to the liquid to convert the sulfite and sulfate into calcium sulfite and gypsum respectively, the calcium sulfite and gypsum thus obtained are separated from the liquid and at the same time the salt of organic acid is regenerated, and then the thus treated liquid containing the salt at a pH of 7 to 8 is recycled to the top of the scrubber.

However, a disadvantage that a nonnegligible amount of vapor of organic acid let loose by the absorption of sulfur dioxide into the absorbing liquid is dispersed from the scrubber in the atmosphere accompanied by the cleaned exhaust gas attends to the above-mentioned process. That is, an alkali salt of an organic acid reacts as is shown below in the course of absorption of sulfur dioxide to be a free organic acid. The most of the free organic acid thus generated is absorbed into the absorbing liquid, but the residual part of the free organic acid is apt to be accompanied with the stream of exhaust gas to disperse in the atmosphere:

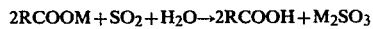

$$2RCOOM + SO_2 + H_2O \rightarrow 2RCOOH + M_2SO_3$$

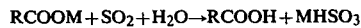

$$RCOOM + SO_2 + H_2O \rightarrow RCOOH + MHSO_3$$

wherein R denotes an alkyl group having carbon atoms of 1 to 4 and M denotes an alkali metal, alkaline earth metal or ammonium group.

Accordingly, the scrubber utilized in the sulfur dioxide-removing process above-mentioned, for instance, a spraying scrubber or a perforated plate-type scrubber are suffering from the problem of dispersion of an organic acid in the atmosphere. Secondary pollution of the atmosphere will be caused by the discharge of the vapor of organic acid thus formed together with the cleaned exhaust gas.

For instance, in the case where a perforated plate-type column is utilized as a scrubber, although sulfur dioxide is substantially completely absorbed more than 99% by volume based on the introduced amount thereof into the scrubber, the vapor of organic acid is discharged generally in the amount of about 5 to about 20 ppm from an outlet for the decontaminated exhaust gas provided at the top of the scrubber. It is due to the fact that in the usual case where an absorbing liquid at a pH of 7 to 8 is introduced from the top of the perforated plate-type scrubber, a hold-up of the absorbing liquid occurs on the uppermost perforated plate and as a result, a rapid absorption of carbon dioxide which is also contained in the exhaust gas to be treated takes place in the above-mentioned hold-up to lower the pH of the absorbing liquid immediately after the introduction rapidly to about 6.0. The absorbing liquid at a pH of lower than about 6.0 has extremely low activity to seize the vapor of organic acid.

For instance, when an exhaust gas containing 1,300 ppm of sulfur dioxide was subjected to SOx-removal with an absorbing liquid of initial pH of 7.5 containing 0.6% by weight of sodium acetate, the concentration of acetic acid in the treated exhaust gas at the outlet of 11th perforated plate was about 15 ppm and at the same time, the pH of the liquid at the uppermost stage of the scrubber was about 6.0. In the case where a scrubber of 12 stages was used to treat the same exhaust gas as above, the concentration of acetic acid in the treated exhaust gas at the outlet of 12th stage was 13 ppm and the pH of the absorbing liquid at the uppermost perforated plate was about 6.1. In spite of further increasing the number of stages of the scrubber, the pH of the absorbing liquid on the uppermost stage was unchangeably 6.1 to 6.2, and it was impossible to reduce the concentration of acetic acid lower than 5 ppm which corresponds to the equilibrium partial pressure at the pH mentioned above. Therefore, it is concluded that in the case where the absorption of sulfur dioxide is almost completed and the pH of the absorbing liquid on the uppermost stage of perforated plates becomes that of the liquid saturated with carbon dioxide in the exhaust gas at the inlet of the scrubber, no surplus of the absorbing effectiveness for acetic acid will be expectable by increasing the number of stages of perforated plates, rather causing the increased pressure loss of the scrubber as a whole.

Accordingly, it is necessary to provide an additional means for further removing the organic acid from the exhaust gas already treated by the scrubber. For such a means, it is recommended that the exhaust gas treated by the scrubber is washed outside of the scrubber loop system with an aqueous alkali solution containing sodium hydroxide, calcium hydroxide, etc. However, the thus recommended means has disadvantages of demolishing the balance within the closed scrubber loop system, of making difficult the control of the scrubber loop and of presumably forming scales within the scrubber.

The main object of the present invention is, in a process of removing sulfur dioxide from an exhaust gas containing sulfur dioxide by the use of an aqueous absorbent containing a salt of an organic acid, to satisfactorily remove the sulfur dioxide as well as to remove the vapor of organic acid by-produced satisfactorily without discharging the acid into the atmosphere. Another object is, under the operation of a perforated plate-type scrubber, to absorb the organic acid discharged from the scrubber into the absorbing liquid. Still another object is to absorb the organic acid into the absorbing liquid within the system of scrubber loop to prevent the loss of the salt of organic acid by evaporation of the acid let loose. Other objects and advantages of the present invention will be apparent to those skilled in the art from the following description.

The present invention offers an improved method and apparatus for the removal of sulfur dioxide while fulfilling the above-mentioned objects.

According to the present invention, a method for removal of sulfur dioxide from an exhaust gas containing sulfur dioxide by the use of an aqueous absorbing liquid containing a salt of an organic acid is offered wherein sulfur dioxide is substantially absorbed into the absorbing liquid and removed from the exhaust gas by bringing the exhaust gas into counter-current contact with the absorbing liquid within a scrubber provided with multistage perforated plates and at the same time, the vapor of organic acid is let loose, characterized in that a plurality of wetted walls are provided on the top of the above-mentioned perforated plates and the above-mentioned absorbing liquid of an adjusted pH of 7 to 8 is introduced into the scrubber from the top of the above-mentioned wetted walls to bring into contact with the organic acid discharged from the top of the perforated plates within the wetted walls resulting in the absorption of the vapor of organic acid into the absorbing liquid and then in the introduction of the resulted absorbing liquid into the perforated plates.

The followings are the more precise explanation of the present invention with reference to the attached drawings:

Of the attached drawings.

In the process of the present invention, by bringing the exhaust gas into contact counter-currently with the absorbent containing the salt of organic acid in the scrubber provided with perforated plates and wetted walls on the plates while maintaining the pH of the absorbent on the walls at more than 6.0, nearly complete absorption of sulfur dioxide is carried out on the perforated plates and nearly complete absorption of vapor of organic acid deprived from the top of the plates is carried out on the wetted walls.

The conventional scrubber for removal of sulfur dioxide consisting only of perforated plates is, as has been described, effective enough to absorb sulfur dioxide, however, it is ineffective in seizing the vapor of organic acid. It is due to the fact, as has been described, that a rapid absorption of carbon dioxide takes place in the hold-up on the uppermost perforated plate to make the initial pH of 7 to 8 of the absorbing liquid introduced into the scrubber rapidly lower to about 6.0.

In order to make the absorbing liquid absorb the vapor of organic acid it is necessary to make the pH of the absorbing liquid higher than about 6.0 as well as to maintain a favorable contact between the vapor of organic acid and the absorbing liquid. Accordingly, the rapid reduction of pH of the absorbing liquid immediately after the introduction thereof into the scrubber should be prevented for the sake of complete absorption of vapor of organic acid.

In the present invention, in order to fulfill the above-mentioned conditions, a plurality of wetted walls are provided above the perforated plates. By providing the wetted walls on a perforated plate-type scrubber, it becomes possible to prevent the formation of the above-mentioned hold-up of absorbing liquid, and accordingly, in the case where an absorbing liquid at a pH of 7 to 8 is introduced into the scrubber, it is possible to maintain the pH of the absorbing liquid at 6 to 7 or 8 in the above-mentioned wetted walls as well as to maintain the favorable contact between the vapor of organic acid and the absorbing liquid. The removal rate of the vapor of organic acid from the top of the perforated plates may be, according to this invention, more than about 90% by volume.

Figure 1:
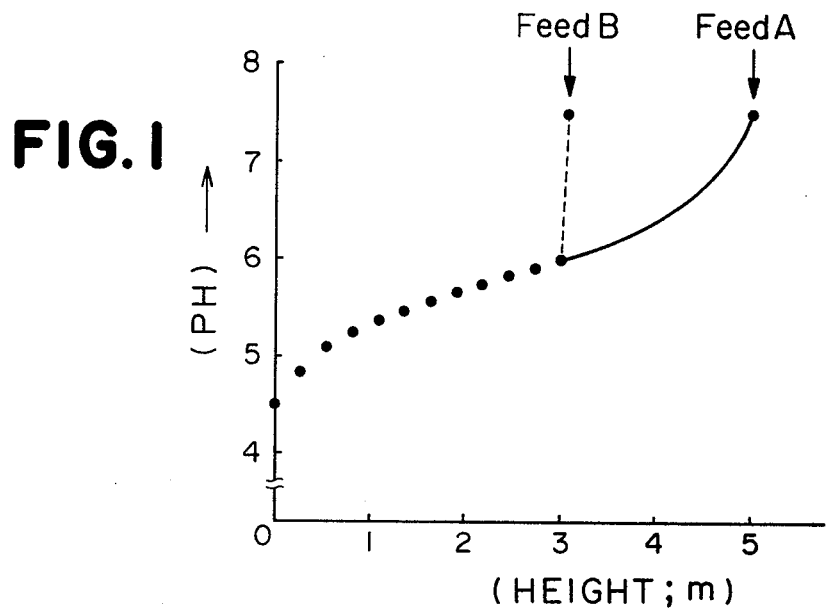
FIG. 1 shows the variation of pH of the absorbing liquid in the scrubber in the case of treating an exhaust gas according to Example 1 mentioned later, in which the ordinate denotes the pH of absorbing liquid and the abscissa denotes the height of the scrubber.

In FIG. 1, the variation of the pH of absorbing liquid in the scrubber is shown in the case where an exhaust gas containing 11% by volume of gaseous carbon dioxide and 1325 ppm of sulfur dioxide was treated according to the method of the present invention with an aqueous solution containing magnesium acetate at a pH of 7.5 as a sulfur dioxide-absorbent. The scrubber used had wetted walls of 2 m in height above the perforated plates of 3 m in height.

As is clearly seen in FIG. 1, the pH of the introduced absorbing liquid (Feed A) shows a moderate reduction from 7.5 to 6.0 in the wetted walls in the range of height from 3 to 5 meters of the scrubber. Accordingly, owing to the moderate reduction of the pH, a favorable gas-liquid contact is obtained between the vapor of organic acid and the absorbing liquid at a pH of 6 to 7.5 which has an ability to seize the vapor of organic acid, thereby resulting a satisfactory seizing of the organic acid by the absorbing liquid. In the next place, the absorbing liquid effluent from the lowermost stage of the wetted walls at a pH of 6.0 flows down on the perforated plates while absorbing sulfur dioxide contained in the exhaust gas and finally changing its pH to 4.5. In FIG. 1, the concentration of the vapor of organic acid is reduced from 12 ppm at the top of the perforated plates to 1 ppm at the top of the wetted walls.

On the other hand, in the case where no wetted walls are provided and an absorbing liquid of pH of 7.5 is let flow from the top of the perforated plates (Feed B), as is shown by the dotted line in FIG. 1, the pH of the absorbing liquid is rapidly reduced from 7.5 to 6.0 in the uppermost perforated plate. Accordingly, in this case, the favorable gas-liquid contact between the vapor of organic acid and the absorbing liquid of pH of higher than 6 could not be obtained with resulting in the discharge of 12 ppm of the vapor of organic acid from the top of the perforated plates.

In the present invention, the total height of the wetted walls is preferably 1 to 4 meters in order to lower the pH of the absorbing liquid slowly in the wetted walls. In addition, it is preferable to wet the walls uniformly by the absorbing liquid in order to obtain a favorable contact between the organic acid and the absorbing liquid in the wetted walls, and for that purpose, the absorbing liquid may be introduced as a spray into the top of the wetted walls and the wetted walls may take the form of multiple multistage.

The salt of an organic acid used herein includes the sodium-, potassium-, ammonium-, and magnesium salts of formic-, acetic-, propionic-, butyric-, and valeric acids respectively, and also such salts of dicarboxylic acids such as malonic-, succinic-, glutaric-, adipic acids, etc. which generate the volatile free organic acids when they are brought into contact with an exhaust gas and when they are subjected to an induced decomposition during the oxidation of sulfite at the latter step usually included in the scrubber loop.

In addition, as has been described, the initial pH of the absorbing liquid introduced into the scrubber according to this invention is adjusted to 7 to 8. In cases where it is higher than 8, the separation out of compounds of calcium and magnesium occurs due to the use of calcium hydroxide or calcium carbonate in the latter step in the scrubber loop, which resulting to presumable scaling. On the other hand, in cases where it is lower than 7, the absorption of the vapor of organic acid, into the absorbent, which evaporates from the top of the perforated plates hardly takes place.

In the present invention, the absorbing liquid flows out from the bottom of the scrubber after absorbing the vapor of organic acid in the wetted walls and further absorbing the sulfur dioxide in the perforated plates within the scrubber. Subsequently, the effluent of the liquid from the scrubber is, as disclosed in, for example, the aforementioned U.S. Pat. Nos. 3,928,537; 3,987,149 and 4,092,402, treated in the circulating loop whereby the effluent is converted into a fresh absorbing liquid containing the salt of organic acid at a pH of 7 to 8 and thereafter being transferred to the inlet for the absorbing liquid provided at the top of the scrubber for the sake of the recycling use thereof. The scope of this invention naturally includes the scrubber circulating loop disclosed in the above-mentioned references.

As has been shown, in the method of the present invention, the disadvantages of the conventional method for the removal of sulfur dioxide by an aqueous solution of a salt of an organic acid, namely the effluence of the vapor of organic acid from the scrubber has been resolved by absorbing effectively the organic acid in the wetted wall-part of the scrubber without affecting the balance of the scrubber loop and meaninglessly enlarging the size of the scrubber, as a result of attaining a high removal of sulfur dioxide and an effective prevention of dispersion of organic acid into the atmosphere.

Furthermore, the present invention also offers a scrubber adequately adapted for the above-mentioned method of the invention. An embodiment of the scrubber provided by the invention is shown in FIG. 2.

Figure 2:
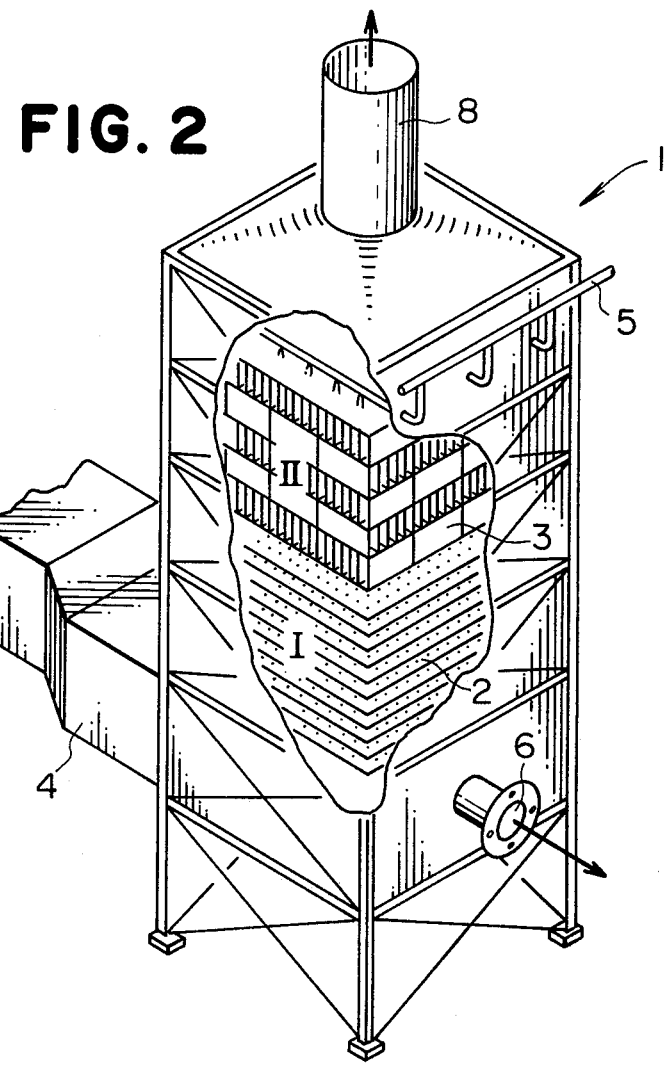
FIG. 2 is a partially-cut perspective view of an embodiment of a scrubber according to the present invention.

The scrubber 1 of FIG. 2 comprises a zone I of absorbing sulfur dioxide at the lower part of the scrubber 1, a zone II of absorbing vapor of organic acid provided on the upper side of the zone I, an inlet 4 for the introduction of the exhaust gas into the scrubber 1 provided beneath the zone I, an inlet 5 for the introduction of the absorbent into the scrubber 1 provided at the top of the zone II, an outlet 6 for the effluence of the absorbent from the scrubber 1 provided at the bottom of the scrubber 1 and an outlet 8 for the discharge of the decontaminated exhaust gas from the scrubber 1.

The zone I of absorbing sulfur dioxide is provided with a group of perforated plates 2 in number of stages of 5 to 20. Although the number of stage in the zone I is optionally fixed according to the concentration of the sulfur dioxide contained in the exhaust gas, the number of stages of 5 to 20 is quite adequate to substantially scrub the sulfur dioxide from the normal exhaust gas. For instance, 12 stages of the perforated plates reduce the concentration of the sulfur dioxide from 1200 ppm at the inlet 4 to 5 ppm at the top of the zone I.

Each of the perforated plates 2 in the zone I has a plurality of holes of 3 to 10 mm in diameter so as to have a perforation of 30 to 55% in area, and the plates 2 are disposed vertically with their planes kept horizontal and a space between each plate of 40 to 500 mm. It is not preferable to enlarge the space between each plate 2 larger than 500 mm because the height of movement of the droplets of the absorbing liquid between the above-mentioned perforated plates 2 is at most 500 mm. It is also not preferable to have the space smaller than 40 mm because of the larger pressure loss.

Figure 3:
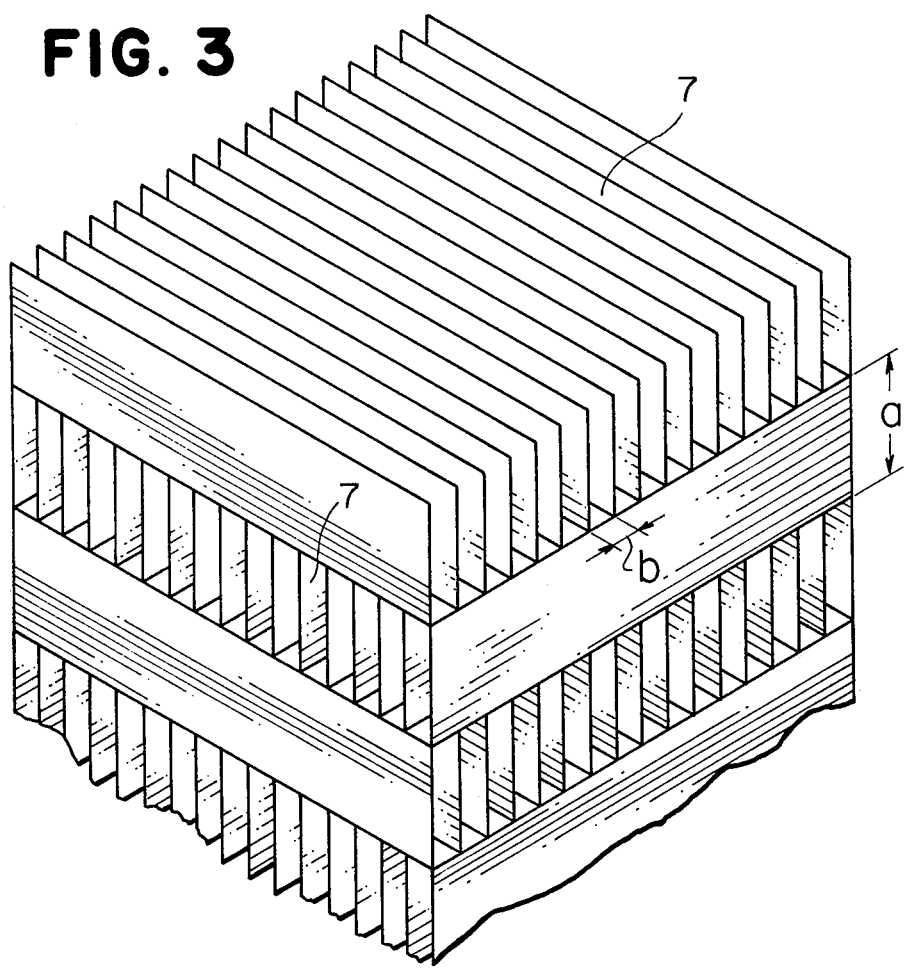
FIG. 3 is an explanatory figure of the arrangement of the plates placed in the zone of absorbing the vapor of organic acid in a scrubber of the present invention.

The zone II of absorbing vapor of organic acid is provided with multiple multistaged wetted walls 3 of a total height of 1 to 4 meters. The wetted walls 3 are constructed, as shown in FIG. 3, by plates 7 piled up in the form of multiple multistage, in which each plate 7 is disposed vertically in parallel in each stage and the direction of the plates 7 of one stage is different from that of plates of the neighbouring stages. By having the different direction of plates 7 in the neighbouring stages, it is possible to maintain the uniform wetting of the whole plates 7 with resulting in obtaining an ideal wetted walls and a favorable absorption of the organic acid.

The above-mentioned height of the wetted walls 3 or that of the zone II is determined by the allowable concentration of the organic acid in the discharged exhaust gas. For instance, in order to reduce the concentration of the organic acid from 5–6 ppm at the top of the zone I, which is comparatively low concentration, to 1 ppm at the top of the zone II, the height of zone II is at least 1 meter. The height of the zone II of over 4 meters is useless in view of a vain enlargement of the apparatus and an adequate removal of the organic acid under the gas-liquid contact of a length of less than 4 meters.

In FIG. 3, the arrangement of the plates 7 in the zone II is shown, in which a stage consisting of the plates 7 of 100 to 300 mm in width, which is represented by the arrow "a", disposed vertically in parallel at interval, which is represented by the arrow "b", of 10 to 30 mm is plied up one after another in number of more than 4 to obtain a total height of 1 to 4 meters. The direction of plates of one stage is different from that of plates of the neighbouring stages by an angle of 90°.

In the case where an exhaust gas containing sulfur dioxide is introduced from the lower part of such a scrubber of FIG. 2 and an absorbing liquid containing a salt of an organic acid at a pH of 7 to 8 is sprayed into the scrubber at its upper part, the sulfur dioxide is absorbed into the liquid in the zone I of perforated plates effectively and substantially removed from the exhaust gas to be a concentration of around 5 ppm in the effluent gas from the zone I, however, a part of organic acid let loose at that time of absorption is evaporated as a gas and it is contained in the effluent exhaust gas at the top of the zone I at a concentration of about 12 ppm. The organic acid contained in the exhaust gas even at a lower concentration is effectively absorbed into the absorbing liquid which flows down from the upper part of the zone II (wetted wall-part) while making a "wetted wall" at a pH of 6.0 to 8 as a result of lowering the concentration of organic acid in the effluent gas to less than 1 ppm.

EXAMPLE 1

An exhaust gas from a heavy oil-burning boiler at a volume rate of 4,150 $Nm^3$/hour containing 1,325 ppm of sulfur dioxide, 11% by volume of carbon dioxide and 10% by volume of water vapor at a temperature of 150° C. was subjected to the removal of sulfur dioxide in a scrubber shown in the attached FIGS. 2 and 3 having a basal dimension of 800×800 mm.

The scrubber consists of an upper part (wetted walls) and a lower part (perforated plates), the lower part being formed by 12 stages of perforated polystyrene plates of 45% in average perforation piled up vertically with a space between plates of 270 mm, and the upper part being formed by vertically piling up a stage of vertically and parallelwise placed polystyrene plates of 180 mm in width at a regular interval of 25 mm and the direction of plates of each stage being different by a right angle from those of neighbouring stages. The upper part thus constitutes a multiple multistaged wetted wall column of a height of 2.0 m.

The absorbing liquid was an aqueous solution containing 0.52% by weight of magnesium acetate, 2.7% by weight of magnesium chloride, 2.0% by weight of magnesium sulfate, 5.0% by weight of crystalline gypsum and the residue of water, of a pH of 7.5 and of a temperature of 55° C.

The absorbing liquid was brought into contact in counter-current with the exhaust gas in the scrubber at a ratio (L/G) of liquid to gas of 2 l/$Nm^3$. After the contact, the absorbing liquid was treated in a scrubber circulating loop wherein the liquid was blown with air to oxidize a sulfite into a sulfate followed by being added with calcium hydroxide to separate a produced gypsum and a filtrate after the separation was recycled to the scrubber.

After the contact, the concentrations of sulfur dioxide in the exhaust gas were 5 ppm at the outlet of the lower part and 1 ppm at the outlet of the upper part of the scrubber, and on the other hand, the concentrations of acetic acid in the exhaust gas were 12 ppm at the outlet of the lower part and 1 ppm at the outlet of the upper part of the scrubber. In addition, the total pressure loss of the scrubber in operation was 160 mm$H_2O$.

COMPARATIVE EXAMPLE

The same exhaust gas as in Example 1 was subjected to the removal of sulfur dioxide in the same manner as in Example 1, however, in a scrubber provided only with the same perforated plates as in Example 1 piled up vertically in number of 15 while being brought into contact with the same absorbing liquid and at the same ratio of liquid to gas as in Example 1.

The concentration of sulfur dioxide in the effluent exhaust gas at the outlet of the scrubber was 3 ppm, and that of acetic acid in the effluent exhaust gas at the outlet of the scrubber was 10 ppm, with the same pressure loss of 160 mm $H_2O$ as in Example 1.

EXAMPLE 2

The same exhaust gas as in Example 1 was introduced into a scrubber having the same structure as in Example 1 and treated therein at first with an aqueous solution containing 0.63% by weight of magnesium adipate, 2.7% by weight of magnesium chloride, 2.0% by weight of magnesium sulfate and 5% by weight of crystalline gypsum, of pH of 7.5 at a temperature of 55° C. as an absorbing liquid for the removal of sulfur dioxide, the after treatment of the once used absorbing liquid being carried out in the same scrubber loop as in Example 1. In the course of the treatment, since magnesium adipate is decomposed to valeric acid and the valeric acid in turn is partially decomposed to butane, 549 g/hour of adipic acid was supplied in order to maintain the concentration of carboxylic acid in the solution.

After 50 hours of the running, the concentrations of magnesium adipate and magnesium valerate in the absorbing liquid were 0.33 and 0.41% by weight, respectively.

The concentration of sulfur dioxide in the thus treated exhaust gas was 5 ppm at the outlet of the perforated plate-part and 1 ppm at the outlet of the multiple multistaged wetted walls, while on the other hand, the concentration of valeric acid in the treated exhaust gas was 0.36 ppm at the outlet of the perforated plate-part and 0.03 ppm at the outlet of the multiple multistages of wetted walls. While the treated exhaust gas at the outlet of the perforated plate-part smelled bad, no odour was detected at the outlet of the multiple multistaged wetted walls.

What is claimed is:

1. A scrubber for removing sulfur dioxide from a sulfur dioxide containing exhaust gas with an aqueous absorbent containing a salt of an organic acid, comprising:

a zone (I) of absorbing sulfur dioxide, a zone (II) of absorbing vapor of organic acid on the upper side of said zone (I), an inlet for said exhaust gas beneath said zone (I), an inlet for said absorbent at the top of said zone (II), an outlet for the effluent of the absorbent at the bottom of said scrubber and an outlet for the discharge of the decontaminated exhaust gas at the top of said scrubber, said zone (I) being provided with multistaged perforated plates in number of 5 to 20, each of said perforated plates having a plurality of holes of 3 to 10 mm in diameter and a perforation of 30 to 55% in area, and being disposed horizontally with an inter-plate distance of 40 to 500 mm, and said zone (I) being provided with multiple multistages of wetted walls with a total height of 1 to 4 meters, each of said stages of said wetted walls having a plurality of plates placed vertically and in parallel, each of said stages being disposed horizontally an inter-stage distance of 100 to 300 mm and being piled up in number of more than 4 and having the direction of plates thereof different from that of adjacent stages, and said vertically placed plates being disposed with an inter-plate distance of 10 to 30 mm.

* * * * *